US008322770B2

(12) United States Patent
Kosuge et al.

(10) Patent No.: US 8,322,770 B2
(45) Date of Patent: Dec. 4, 2012

(54) PICK-UP STYLE UTILITY VEHICLE WITH EXPANDABLE CARGO BED

(75) Inventors: Hideyoshi Kosuge, Kobe (JP); Hirokazu Morita, Kakogawa (JP); Ryouji Negi, Nishinomiya (JP); Masaki Nishiyabu, Akashi (JP); Tomohiro Kanazawa, Osaka (JP); Teruaki Yamamoto, Lincoln, NE (US); Hideaki Shinnoki, Kobe (JP); Masashi Sakata, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 393 days.

(21) Appl. No.: 12/648,575

(22) Filed: Dec. 29, 2009

(65) Prior Publication Data

US 2011/0156441 A1 Jun. 30, 2011

(51) Int. Cl.
*B60N 3/00* (2006.01)
(52) U.S. Cl. .................................. 296/24.43; 296/183.1
(58) Field of Classification Search .................. 296/165, 296/171, 175, 24.3, 24.33, 24.4, 24.43, 26.08, 296/62.09, 26.1, 26.11, 183.1, 183.2, 190.03, 296/191, 37.6, 64, 65.01, 66, 65.09, 26.09; 280/756, 749

See application file for complete search history.

(56) References Cited

U.S. PATENT DOCUMENTS

| 4,480,868 | A  | * | 11/1984 | Koto ......................... 296/190.11 |
| 6,478,355 | B1 | * | 11/2002 | Van Eden et al. ............ 296/37.6 |
| 6,786,535 | B1 | * | 9/2004  | Grzegorzewski et al. ........................ 296/190.11 |
| 6,905,159 | B1 |   | 6/2005  | Saito et al. |
| 6,994,388 | B2 |   | 2/2006  | Saito et al. |
| 7,249,798 | B2 |   | 7/2007  | Saito et al. |
| 2002/0070573 | A1 | * | 6/2002  | Song ............................ 296/37.6 |
| 2004/0217614 | A1 | * | 11/2004 | Schlecht ....................... 296/24.4 |
| 2009/0256388 | A1 | * | 10/2009 | Tanaka et al. .............. 296/186.4 |
| 2010/0308614 | A1 | * | 12/2010 | Arnold ......................... 296/37.6 |

* cited by examiner

*Primary Examiner* — Jason S Morrow
(74) *Attorney, Agent, or Firm* — Wenderoth, Lind & Ponack, LLP

(57) ABSTRACT

A pick-up style utility vehicle according to the present invention has a front seat, a rear seat, and a cargo bed in this order from front, a cabin frame surrounding a riding space, and a screen shield partitioning the cargo bed and a rear riding space in front of the cargo bed. The cargo bed is changeable between an expanded state in which the cargo bed is expanded forward to the rear riding space and a non-expanded state not occupying the rear riding space. All or part of the screen shield is angle shiftable between the expanded state and the non-expanded state.

4 Claims, 11 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 16 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 16, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify a moving operation of a screen shield with expanding and contracting operations of a cargo bed, thereby performing the operations easily and immediately even by one operator.

To achieve the above object, the present invention provides a pick-up style utility vehicle having a front seat, a rear seat, and a cargo bed in this order from front, a cabin frame surrounding a riding space, and a screen shield partitioning the cargo bed and a rear riding space in front of the cargo bed, wherein the cargo bed is changeable between an expanded state in which the cargo bed is expanded forward to the rear riding space and a non-expanded state not occupying the rear riding space, and all or part of the screen shield is angle shiftable between the expanded state and the non-expanded state.

With the above configuration, in the operation of expanding or contracting the cargo bed, the screen shield is changeable between the expanded state and the non-expanded state without lifting the screen shield. In other words, the state of the screen shield can be easily changed by one operator.

According to the present invention, preferably, in the expanded state, the lower portion of the screen shield is angle shifted forward and upward to configure the cover of the expandable portion of the cargo bed.

With the above configuration, the lower portion of the screen shield configures the cover of the expandable portion of the cargo bed so that the jumping of a load out of the expandable portion can be prevented.

According to the present invention, preferably, in the expanded state, the lower portion of the screen shield is angle shifted forward and downward to configure the floor surface of the expandable portion of the cargo bed.

With the above configuration, the lower portion of the screen shield configures the floor surface of the expandable portion of the cargo bed. Therefore, the floor surface of the expandable portion of the cargo bed need not be additionally formed so that the configuration of the cargo bed can be simplified.

According to the present invention, preferably, the lower portion of the screen shield can be divided into a left portion and a right portion, and in the expanded state, the left portion and the right portion configure the left side panel and the right side panel of the expandable portion of the cargo bed.

With the above configuration, the lower portion of the screen shield configures the side panel of the expandable portion of the cargo bed. Therefore, the side panel of the expandable portion of the cargo bed need not be additionally provided so that the configuration of the cargo bed can be simplified.

According to the present invention, preferably, in the expanded state, the screen shield is erected, and in the non-expanded state, the screen shield is angle shifted rearward and downward to configure the cover portion of the cargo bed.

With the above configuration, the screen shield configures the cover portion of the cargo bed in the non-expanded state of the cargo bed. Therefore, the jumping of a load out of the cargo bed can be prevented.

According to the present invention, preferably, the screen shield has a frame portion and a mesh portion, and the mesh portion is supported by an upper end of the frame portion and is swingable with the upper end as a swinging shaft.

With the above configuration, the mesh portion is swung to form a gap between the rear riding space and the cargo bed so that a load can be loaded from the rear riding space into the cargo bed.

According to the present invention, preferably, the screen shield has plural handle portions.

With the above configuration, the screen shield can be easily angle shifted by one person.

According to the present invention, preferably, the screen shield is attachable to and detachable from the rear end of the cargo bed.

With the above configuration, the screen shield is attachable to the rear end of the cargo bed. Thus, the dropping of a load rearward from the cargo bed can be prevented when the pick-up style utility vehicle is accelerated or goes up a slope.

DETAILED DESCRIPTION OF THE PREFERRED EMBODIMENTS

[First Embodiment of the Present Invention]

Figure 1:
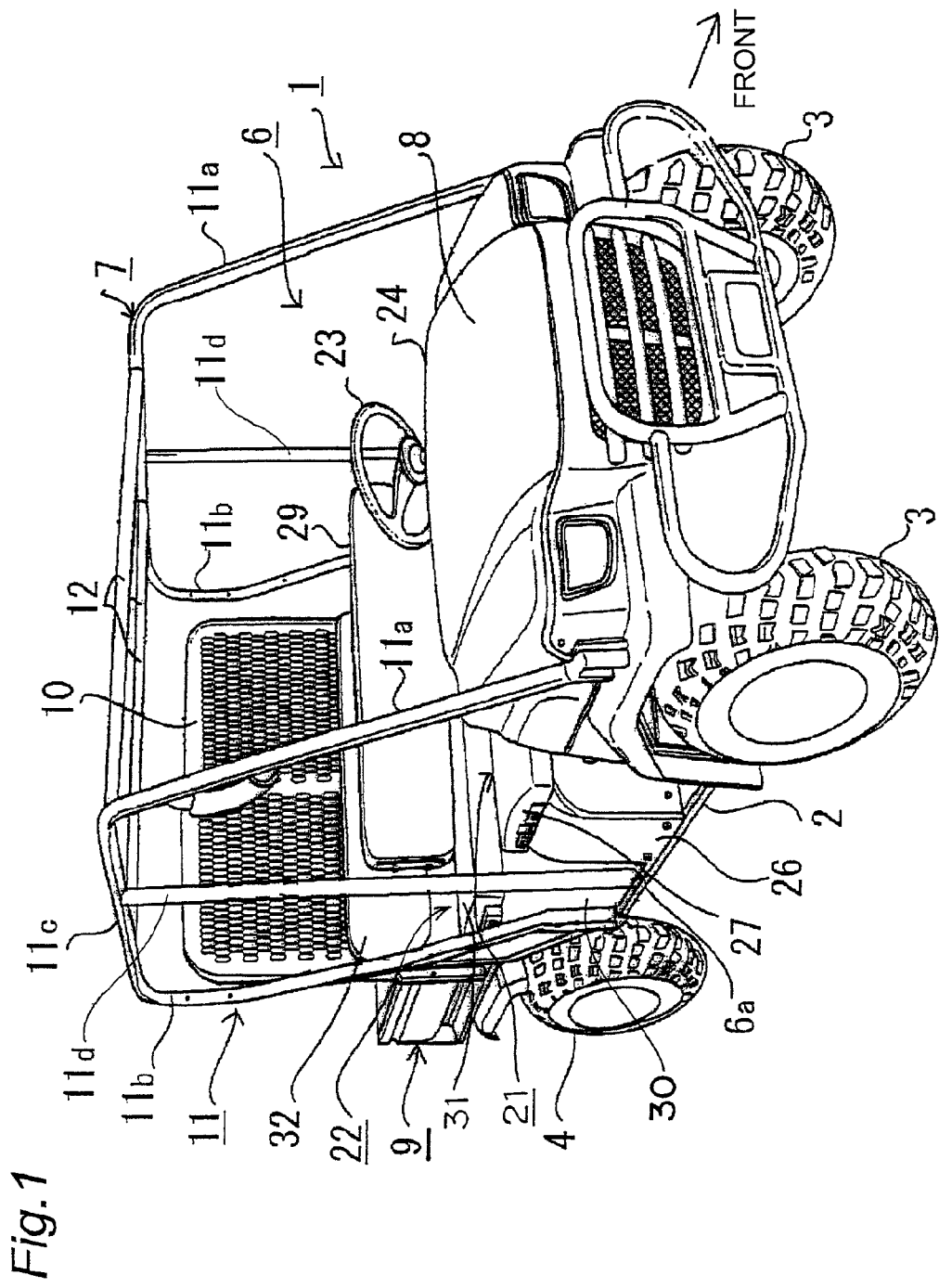
FIG. 1 is an overall perspective view of a pick-up style utility vehicle according to a first embodiment of the present invention.
Figure 2:
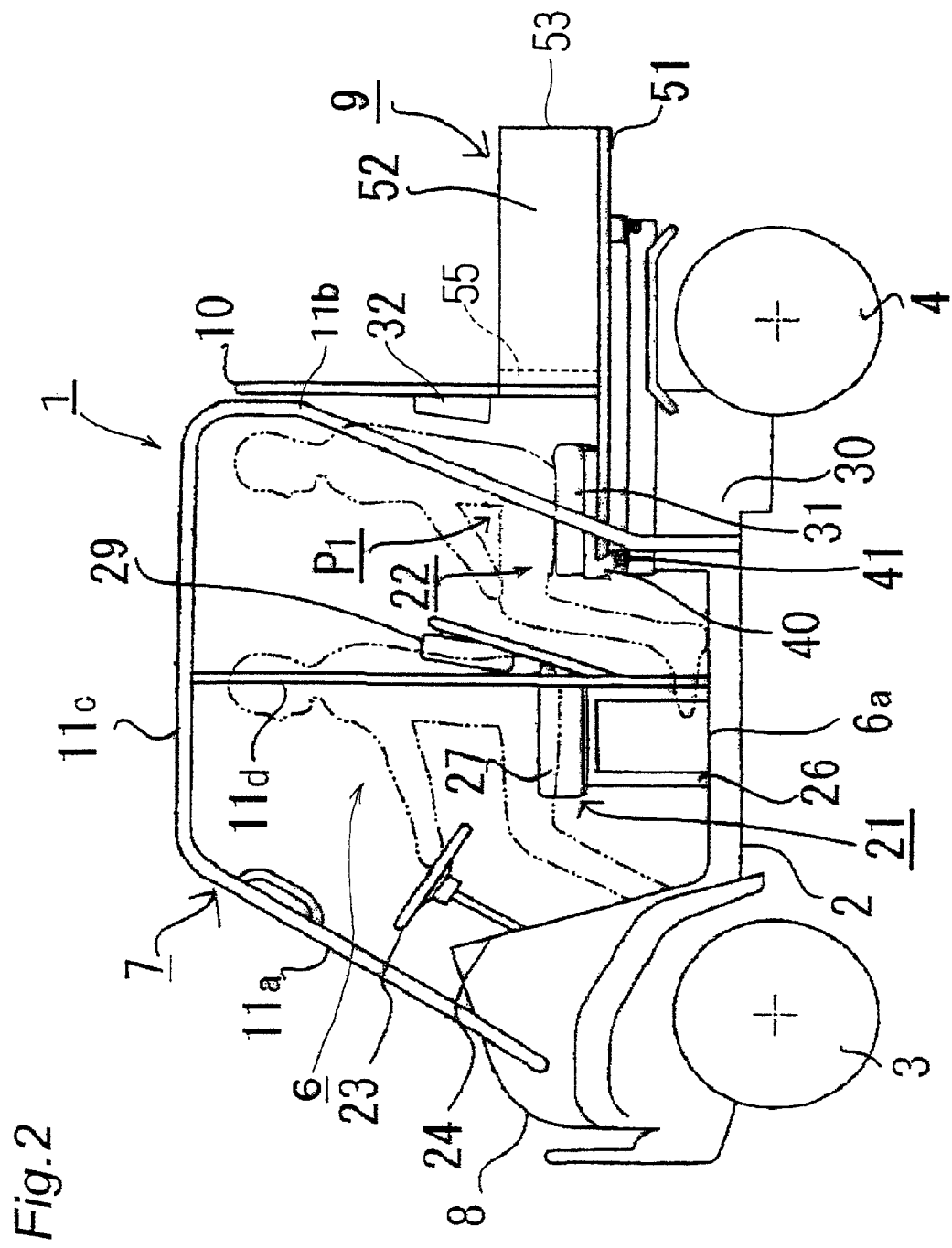
FIG. 2 is a left side view of the pick-up style utility vehicle of FIG. 1 in which a cargo bed is in a non-expanded state.
Figure 3:
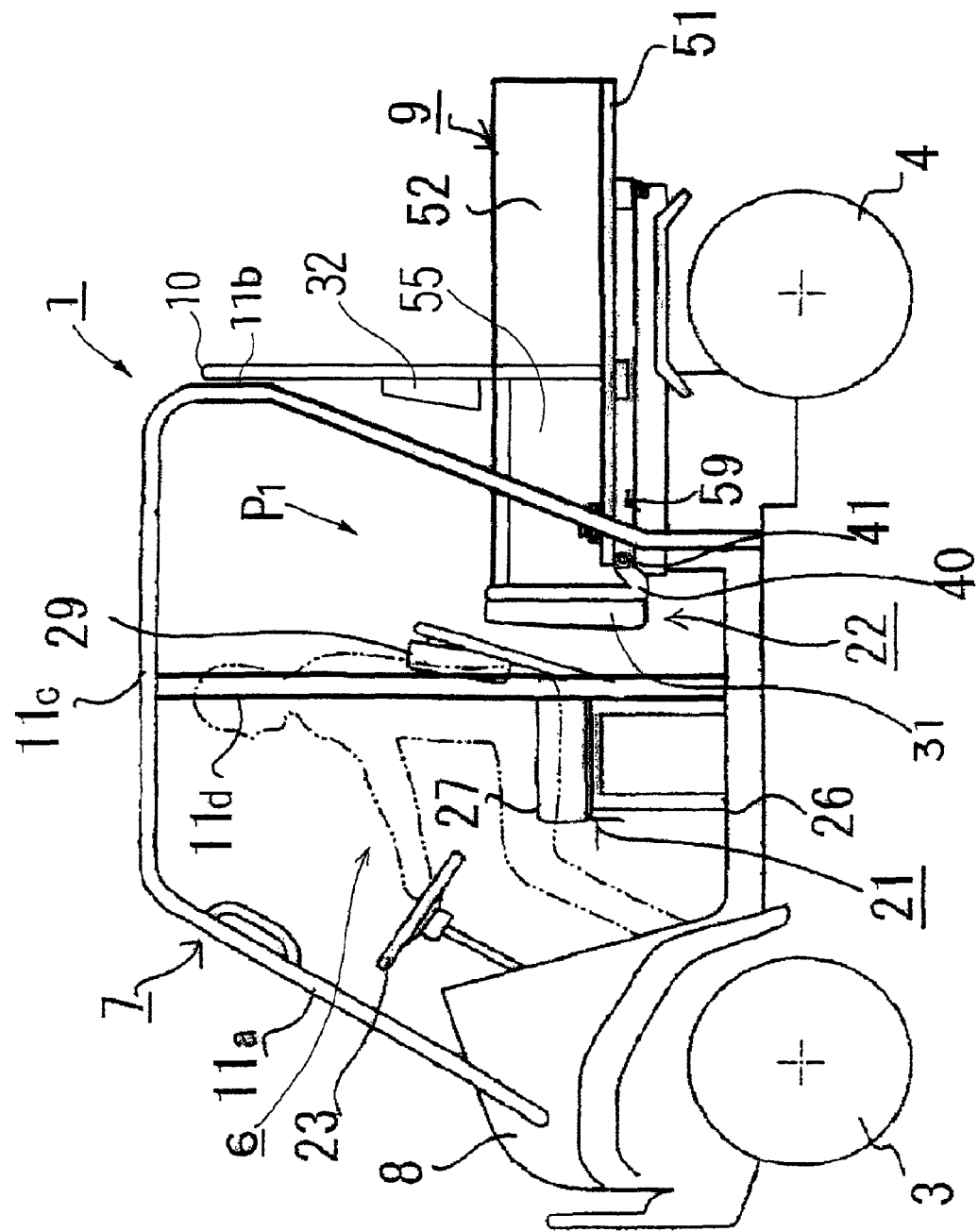
FIG. 3 is a left side view of the pick-up style utility vehicle of FIG. 1 in which the cargo bed is in an expanded state.

FIGS. 1 to 4 show a pick-up style utility vehicle 1 with an expandable cargo bed according to a first embodiment of the present invention, which is changeable between 4 passengers transformation contracting a cargo bed 9 (a non-expanded state of the cargo bed 9) as shown in FIG. 2 and 2 passengers transformation folding a rear seat 22 and expanding the cargo bed 9 forward (an expanded state of the cargo bed 9) as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be position changeable forward and rearward.

The cabin frame 7 surrounding the cabin 6 has a pair of left and right side frame members 11 formed in an inverted U-shape and made of metal pipes, and a cross frame member 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion lid 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

FIG. 2 is a left side view of the pick-up style utility vehicle of FIG. 1 in 4 passengers transformation. The bench-shaped front seat 21 has a seat leg 26 erected on the floor surface 6a of the cabin 6, a seat bottom 27 provided on the upper end face of the seat leg 26, and a backrest 29 fixed via supporting stays to the intermediate vertical portions 11d. The bench-shaped front seat 21 is typically extended leftward and rightward to neat the left and right ends of the cabin 6 so that two persons can be seated side by side. A driver can be seated on one seating area (left side) and a passenger can be seated on the other seating area. The bench-shaped rear seat 22 has a seat bottom 31 arranged on the upper side of a box 30 housing an engine (not shown). As in the front seat 21, the seat bottom 31 is extended leftward and rightward to near the left and right ends of the cabin 6 so that two passengers can be seated side by side.

The configuration of the rear seat 22 will be described. The seat bottom 31 is fixed onto the upper surface of a supporting base 40. The front end of the supporting base 40 is rotatably supported at the front upper end of the box 30 via a hinge 41.

FIG. 3 is a left side view of the pick-up style utility vehicle of FIG. 1 in 2 passengers transformation. The seat bottom 31 is rotated about the hinge 41 and becomes in a substantially vertical state so that the rear seat 22 becomes in a retracted state. The rear seat 22 is retracted so that a rear riding space P1 can be used as the forward expanded space of the cargo bed 9.

The cargo bed 9 has a bottom plate 51, a pair of stationary side panels 52 provided substantially perpendicular to the bottom plate 51 along the left and right ends of the bottom plate 51, and an openable and closeable gate type rear panel 53 provided at the rear end of the bottom plate 51. In addition to these members, to expand the cargo bed 9 forward, the cargo bed 9 has a pair of left and right expandable side panels 55 which can be opened forward to the left and right.

Figure 4:
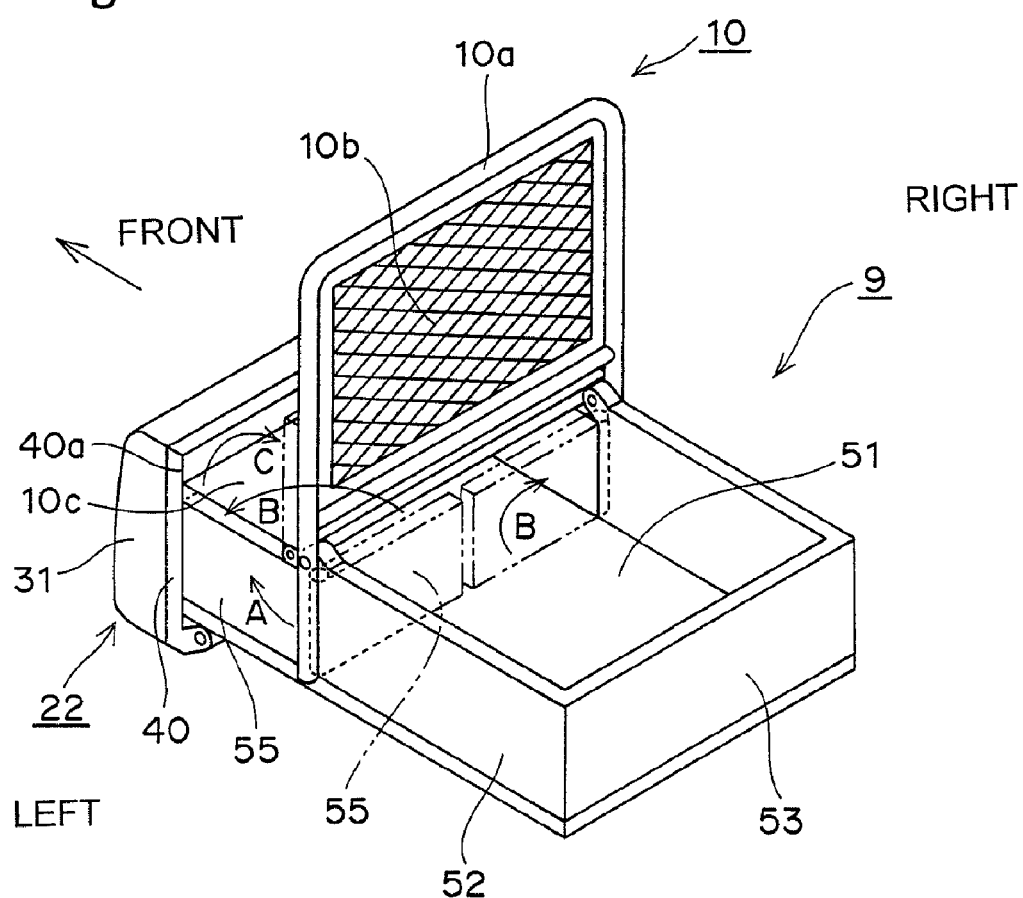
FIG. 4 is a schematic perspective view of an expandable cargo bed 9 and a screen shield 10.

FIG. 4 is a schematic perspective view of the expandable cargo bed 9 and the screen shield 10 of FIG. 3. The screen shield 10 has a gate-shaped frame 10a provided on the bottom plate 51, a metal net 10b attached to the upper portion of the frame 10a, and a lower member 10c attached to the lower portion of the frame 10a and angle shiftable forward and upward. The lower member 10c is attached to the frame 10a by hinges, for example.

As shown in FIGS. 2 and 3, a backrest 32 for a passenger seated on the rear seat 22 is attached to the net 10b. As shown in FIGS. 2 and 4, in the non-expanded state of the cargo bed 9, the expandable side panels 55 are located in the rear portion of the lower member 10c.

The operation of changing 4 passengers transformation shown in FIG. 2 to 2 passengers transformation shown in FIG. 3 and expanding the cargo bed 9 from the non-expanded state to the expanded state will be described.

When 4 passengers transformation is changed to 2 passengers transformation, the seat bottom 31 is rotated about the hinge 41 forward together with the supporting base 40 so as to be in a substantially erected state. The supporting base 40 forms the front panel of the expandable portion of the cargo bed 9.

As indicated by an arrow A of FIG. 4, the lower member 10c is angle shifted forward and upward and is fixed to the rear seat 22 in a substantially erected state. The lower member 10c becomes in a substantially horizontal state to form the cover of the expandable portion of the cargo bed 9.

In the non-expanded state of the cargo bed 9, the expandable side panels 55 located in the rear portion of the lower member 10c are opened forward to the left and right, as indicated by arrows B of FIG. 4, and form the left and right side panels of the expandable portions of the cargo bed 9 forward from the front ends of the stationary side panels 52.

As described above, in this embodiment, the screen shield 10 need not be lifted and moved. The operation of changing 4 passengers transformation (the non-expanded state of the cargo bed 9) to 2 passengers transformation (the expanded state of the cargo bed 9) can be easily performed by one person.

When 2 passengers transformation shown in FIG. 3 is changed to 4 passengers transformation shown in FIG. 2 and the cargo bed 9 is changed from the expanded state to the non-expanded state, the expanding operation may be reverse. Also in this case, the screen shield 10 need not be lifted and moved. The operation of changing 2 passengers transformation (the expanded state of the cargo bed 9) to 4 passengers transformation (the non-expanded state of the cargo bed 9) can be easily performed by one person.

The lower member 10c forms the cover of the expandable portion of the cargo bed 9. Thus, the jumping of a load loaded in the expandable portions of the cargo bed 9 upward can be prevented.

In the expanded state of the cargo bed 9, the lower member 10c is fixed to the rear seat 22. The lower member 10c may be fixed to the expandable side panels 55 opened leftward and rightward.

In the state of FIG. 4, the lower member 10c in a substantially horizontal state may be angle shifted more upward, as indicated by an arrow C. When the lower member 10c is angle shifted more upward, a gap can be formed between the rear seat 22 in a substantially erected state and the lower member 10c. A load can be loaded from the gap into the cargo bed 9.

Preferably, the supporting base 40 forming the front panel of the expandable portion of the cargo bed 9 is formed of a metal plate or a metal plate is attached to a back surface 40a of the supporting base 40. In this case, the expanded state of the cargo bed 9, the collision of a load loaded into the cargo bed 9 with the supporting base 40 to damage the rear seat 22 can be prevented.

[Modification Example of the First Embodiment]

Figure 5:
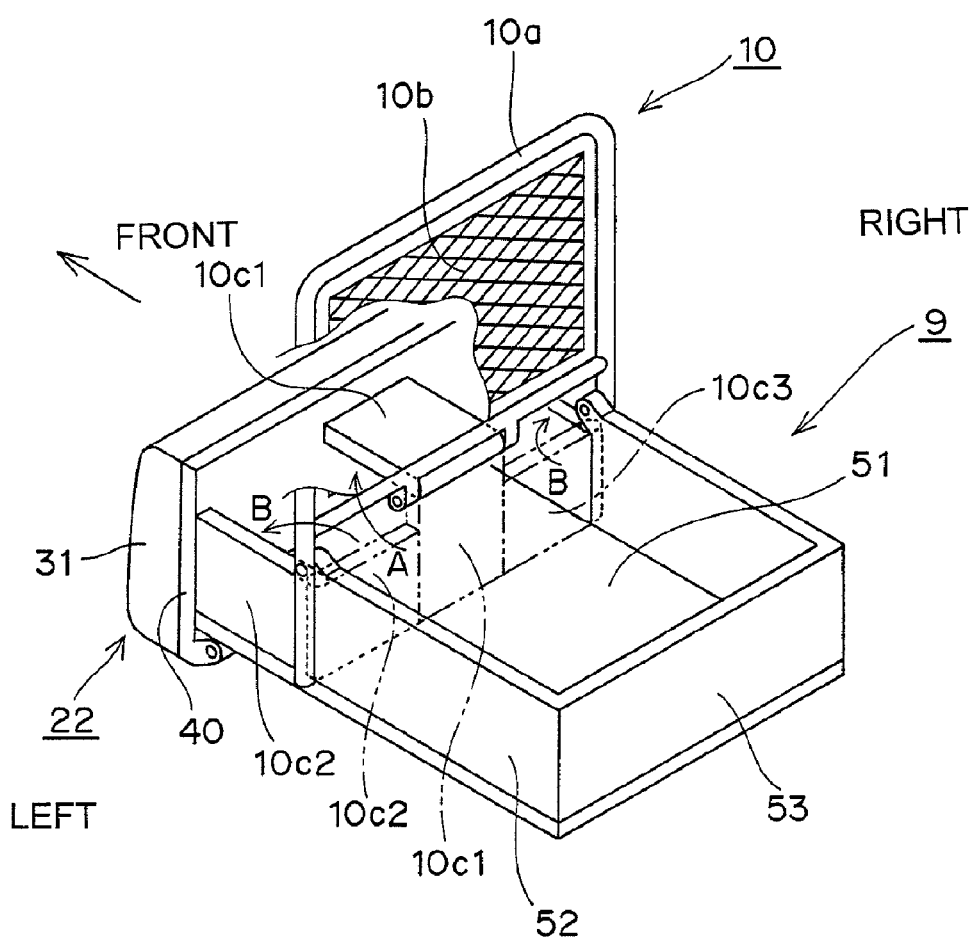
FIG. 5 is a schematic perspective view of the cargo bed 9 and the screen shield 10 according to a modification example of the first embodiment.

FIG. 5 is a schematic perspective view of a cargo bed 9 and a screen shield 10 according to a modification example of the first embodiment. As shown in FIG. 5, the lower member 10c has a left portion 10c2, a right portion 10c3, and a middle portion 10c1. The left portion 10c2, the right portion 10c3, and the middle portion 10c1 can be separated from each other.

When 4 passengers transformation (the non-expanded state of the cargo bed 9) is changed to 2 passengers transformation (the expanded state of the cargo bed 9), the middle portion 10c1 of the lower member 10c is angle shifted forward and upward and is fixed to the rear seat 22, as indicated by an arrow A of FIG. 5. The middle portion 10c1 is in a substantially horizontal state to form the cover covering the middle portion of the upper surface of the expandable portion of the cargo bed 9.

As indicated by arrows B of FIG. 5, the left portion 10c2 of the lower member 10c is opened forward to the left and the right portion 10c3 of the lower member 10c is opened forward to the right. The left portion 10c2 forms the left side panel of the expandable portion of the cargo bed 9 forward from the front end of the stationary side panel 52. The right portion 10c3 forms the right side panel of the expandable portion of the cargo bed 9 forward from the front end of the stationary side panel 52.

According to this embodiment, the left portion 10c2 and the right portion 10c3 of the lower member 10c of the screen shield 10 configure the side panels of the expandable portions of the cargo bed 9. Therefore, the side panels of the expandable portions of the cargo bed 9 need not be additionally provided so that the configuration of the cargo bed 9 can be simplified.

[Another Modification Example of the First Embodiment]

Figure 6:
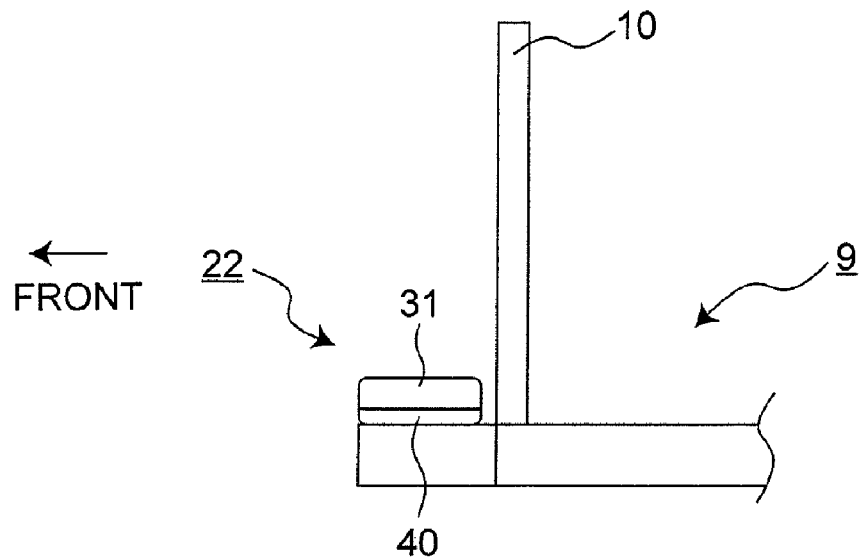
FIG. 6 is a left side schematic diagram of the cargo bed 9 and the screen shield 10 according to another modification example in which the cargo bed is in the non-expanded state.
Figure 7:
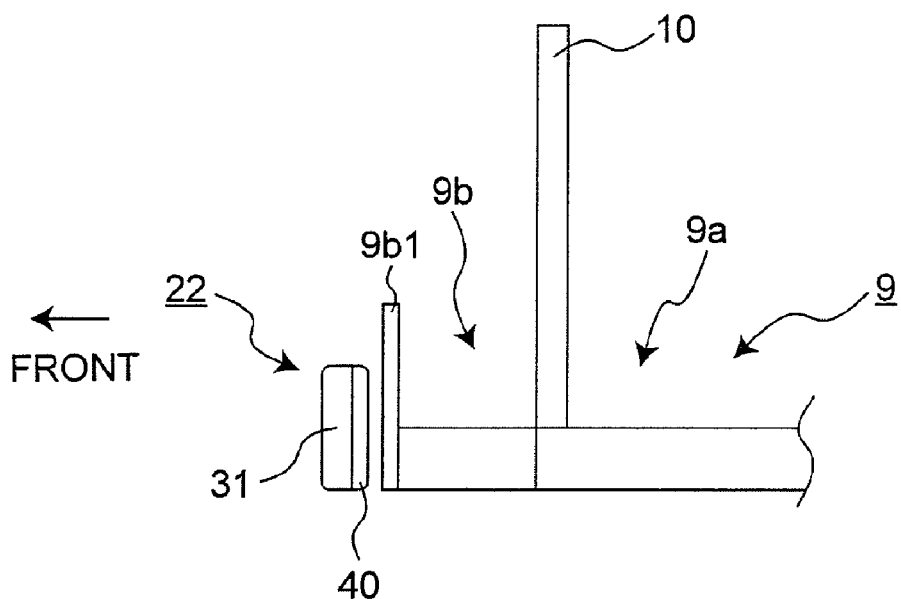
FIG. 7 is a left side schematic diagram of the cargo bed 9 and the screen shield 10 according to another modification example in which the cargo bed is in the expanded state.

FIGS. 6 and 7 are another modification example of the first embodiment of the present invention. FIG. 6 is a left side schematic diagram of a cargo bed 9 and a screen shield 10 in which the cargo bed 9 is in the non-expanded state. FIG. 7 is a left side schematic diagram of a cargo bed 9 and a screen shield 10 in which the cargo bed 9 is in the expanded state. As shown in FIG. 7, when the screen shield 10 is not angle shifted, the cargo bed 9 is divided into a front portion 9b (the expandable portion of the cargo bed 9) from the screen shield 10 and a rear portion 9a from the screen shield 10 in the expanded state of the cargo bed 9. As shown in FIG. 7, a front panel 9b1 of the front portion 9b is additionally provided. The front panel of the front portion 9b may be formed by the supporting base 40 of the rear seat 22.

According to this embodiment, when the screen shield 10 is not angle shifted and a load loaded into the rear portion 9a is contacted with the screen shield 10 so that the screen shield 10 is hard to be angle shifted and when the screen shield 10 is angle shifted so that loads loaded into the rear portion 9a are collapsed, a load loaded into the rear portion 9a is left as-is and another load can be loaded into the front portion 9b.

As described above, in this embodiment, the screen shield 10 need not be lifted and moved and, furthermore, the screen shield 10 need not be angle shifted. Therefore, the operation of expanding and contracting the cargo bed 9 can be easily performed by one person.

[Second Embodiment]

Figure 8:
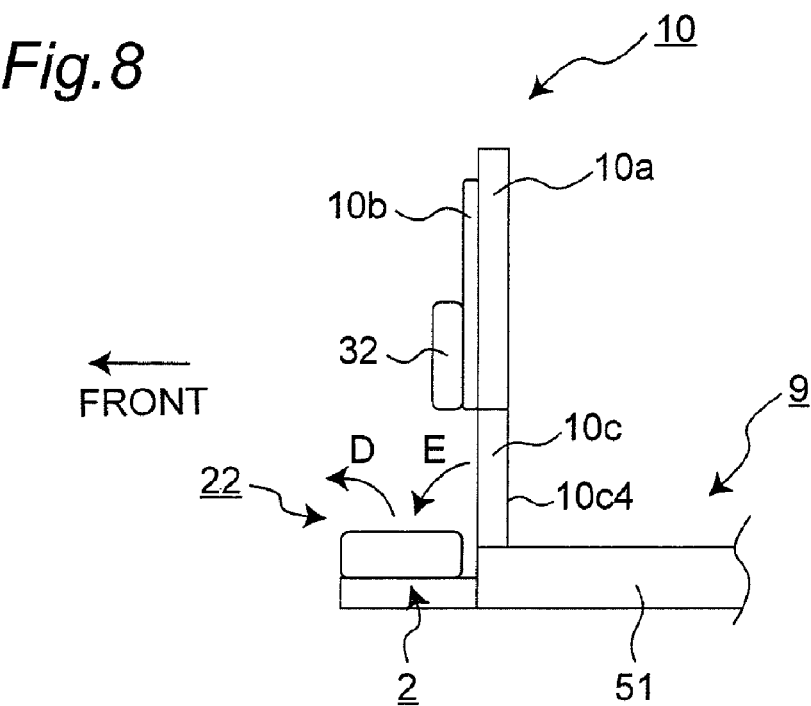
FIG. 8 is a left side schematic diagram of a cargo bed 9 and a screen shield 10 according to a second embodiment of the present invention in which the cargo bed 9 is in the non-expanded state.
Figure 9:
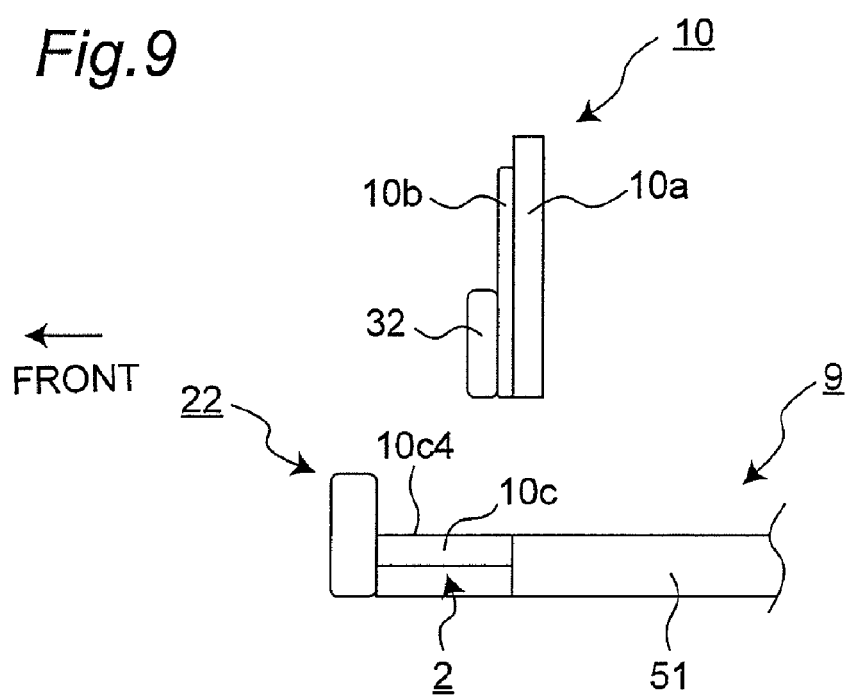
FIG. 9 is a left side schematic diagram of a cargo bed 9 and a screen shield 10 in which the cargo bed 9 is in the expanded state.

FIGS. 8 and 9 are a second embodiment of the present invention. FIG. 8 is a left side schematic diagram of a cargo bed 9 and a screen shield 10 in which the cargo bed 9 is in the non-expanded state. FIG. 9 is a left side schematic diagram of a cargo bed 9 and a screen shield 10 in which the cargo bed 9 is in the expanded state. The second embodiment has the same configuration as that of the first embodiment except that the following configuration (a) is different. Like components are indicated by like reference numerals.

(a) As shown in FIGS. 8 and 9, the lower member 10c of the screen shield 10 can be angle shifted forward and downward. For example, the lower member 10c can be separated from the frame 10a and is attached to the front end of the floor plate 51 of the cargo bed 9 via a hinge.

When 4 passengers transformation (the non-expanded state of the cargo bed 9) of FIG. 8 is changed to 2 passengers transformation (the expanded state of the cargo bed 9) of FIG. 9, the rear seat 22 is rotated forward as indicated by an arrow D so as to be in a substantially erected state.

As indicated by an arrow E, the lower member 10c is angle shifted forward and downward and is mounted on the vehicle body 2 in a substantially horizontal state. In this case, a back surface 10c4 of the lower member 10c forms the floor surface of the expandable portion of the cargo bed 9.

According to the second embodiment, the screen shield 10 can be shifted by angle shifting the lower member 10c so that the state of the screen shield 10 can be easily changed by one operator. In addition, the lower member 10c of the screen shield 10 configures the floor surface of the expandable portion of the cargo bed 9. Therefore, the floor surface of the expandable portion of the cargo bed 9 need not be formed so that the configuration of the cargo bed 9 can be simplified.

Preferably, the lower member 10c is formed by a metal plate or a metal plate is attached to the back surface 10c4 of the lower member 10c. In this case, in the expanded state of the cargo bed 9, the damage of the vehicle body 2 due to a load loaded in the cargo bed 9 can be prevented.

As shown in FIG. 9, the total of the thickness of the vehicle body 2 and the thickness of the lower member 10c is preferably equal to the thickness of the bottom plate 51 so that the upper surface of the bottom plate 51 of the cargo bed 9 and the back surface 10c4 of the lower member 10c form the same plane.

[Third Embodiment]

Figure 10:
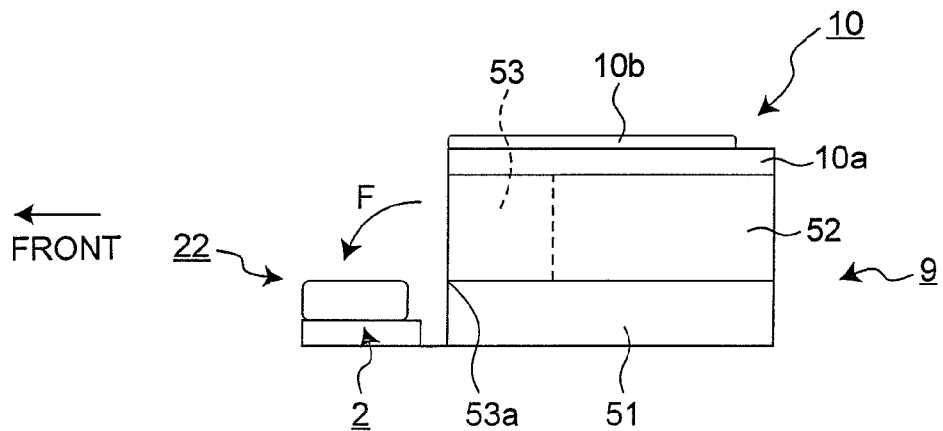
FIG. 10 is a left side schematic diagram of a cargo bed 9 and a screen shield 10 according to a third embodiment of the present invention in which the cargo bed 9 is in the non-expanded state.
Figure 11:
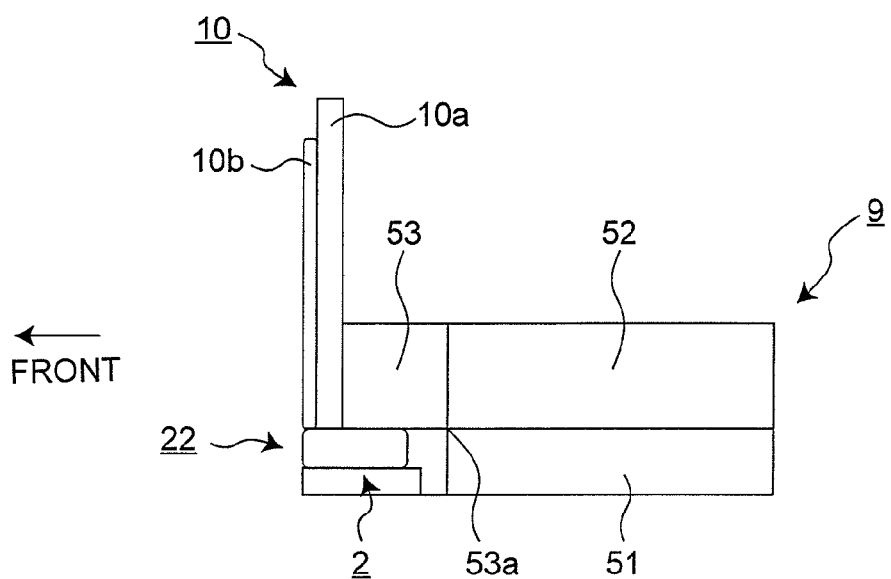
FIG. 11 is a left side schematic diagram of the cargo bed 9 and the screen shield 10 in which the cargo bed 9 is in the expanded state.

FIGS. 10 and 11 are a third embodiment of the present invention. FIG. 10 is a left side schematic diagram of a cargo bed 9 and a screen shield 10 in which the cargo bed 9 is in the non-expanded state. FIG. 11 is a left side schematic diagram of a cargo bed 9 and a screen shield 10 in which the cargo bed 9 is in the expanded state. The third embodiment has the same configuration as that of the first embodiment except that the following configuration (b) is different. Like components are indicated by like reference numerals.

(b) As shown in FIGS. 10 and 11, the screen shield 10 and the expandable side panel 53 of the cargo bed 9 are coupled. The screen shield 10 and the expandable side panel 53 can be angle shifted about a fulcrum 53a. As shown in FIG. 10, in the non-expanded state of the cargo bed 9, the screen shield 10 is in a horizontal state to configure the cover portion of the cargo bed 9.

When 4 passengers transformation (the non-expanded state of the cargo bed 9) of FIG. 10 is changed to 2 passengers transformation (the expanded state of the cargo bed 9) of FIG. 11, the screen shield 10 and the expandable side panel 53 are rotated about the fulcrum 53a forward, as indicated by an arrow F. The screen shield 10 in a substantially horizontal state configuring the cover portion of the cargo bed 9 becomes in a substantially erected state on the seat 22. The expandable side panel 53 is also rotated forward according to the rotation of the screen shield 10 and configures the left or right side panel of the expandable portion of the cargo bed 9 forward from the front end of the stationary side panel 52.

According to the third embodiment, the screen shield 10 can be shifted by being rotated about the fulcrum 53a forward and rearward so that the state of the screen shield 10 can be easily changed by one operator. In addition, in the non-expanded state of the cargo bed 9, the screen shield 10 forms the cover portion of the cargo bed 9 to prevent a load from jumping out from the cargo bed 9.

[Fourth Embodiment]

Figure 12:
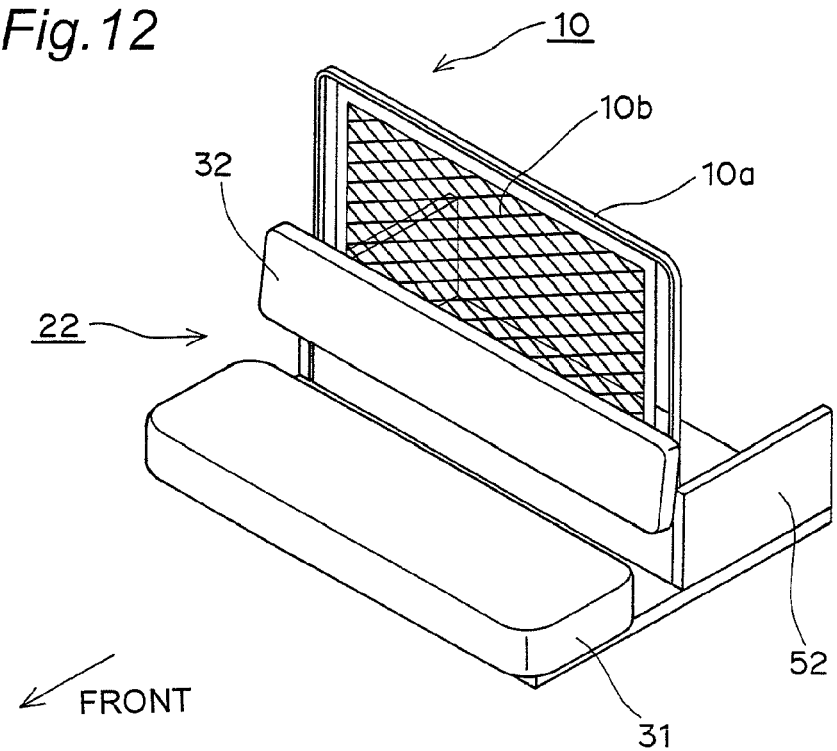
FIG. 12 is a schematic perspective view of a cargo bed 9 and a screen shield 10 according to a fourth embodiment of the present invention.
Figure 13:
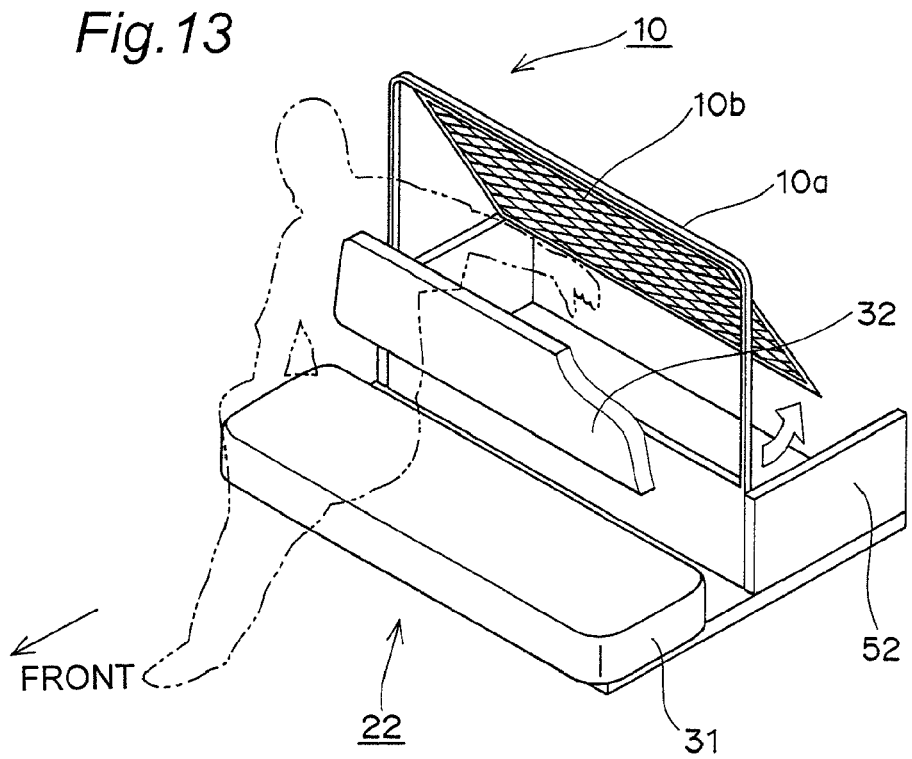
FIG. 13 is a schematic perspective view of the cargo bed 9 and the screen shield 10 according to the fourth embodiment of the present invention.

FIGS. 12 and 13 are schematic perspective views of a cargo bed 9 and a screen shield 10 showing a fourth embodiment of the present invention. As shown in FIGS. 12 and 13, in the non-expanded state and the expanded state of the cargo bed 9, the net 10b of the screen shield 10 is swung rearward with respect to the frame 10a. In this embodiment, the backrest 32 is attached to the frame 10a, not the net 10b.

The net 10b can be fixed to the frame 10a, the rear seat 22, or the stationary side panels 52. Accordingly, the net 10b is not swung forward with respect to the frame 10a. As fixing means of the net 10b, various fixing means of an insertion, pin, clamp, bolt, or magnet type can be used.

The net 10b is swung rearward with respect to the frame 10a to form a gap between the rear seat 22 and the cargo bed 9. A load can be loaded from the rear seat 22 into the cargo bed 9.

[Fifth Embodiment]

Figure 14:
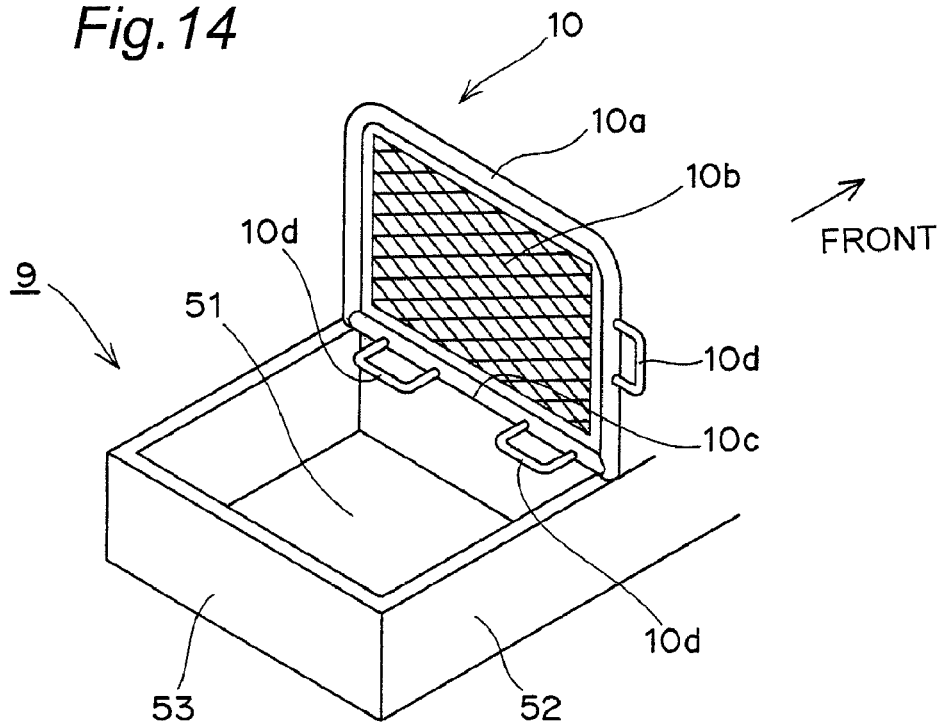
FIG. 14 is a schematic perspective view of a cargo bed 9 and a screen shield 10 according to a fifth embodiment of the present invention.

FIG. 14 is a schematic perspective view of a cargo bed 9 and a screen shield 10 showing a fifth embodiment. As shown in FIG. 14, the screen shield 10 has a plurality of handle portions 10d. The handle portions 10d are preferably provided on the screen shield 10 so that the screen shield 10 can be angle shifted by one person. For instance, the handle portions 10*d* are provided on the side portions of the frame 10*a* or the lower member 10*c*. The handle portions 10*d* may also be provided on the net portion 10*b* of the screen shield 10.

According to the fifth embodiment, the screen shield 10 has the handle portions 10*d* so that it can be easily angle shifted.

[Sixth Embodiment]

Figure 15:
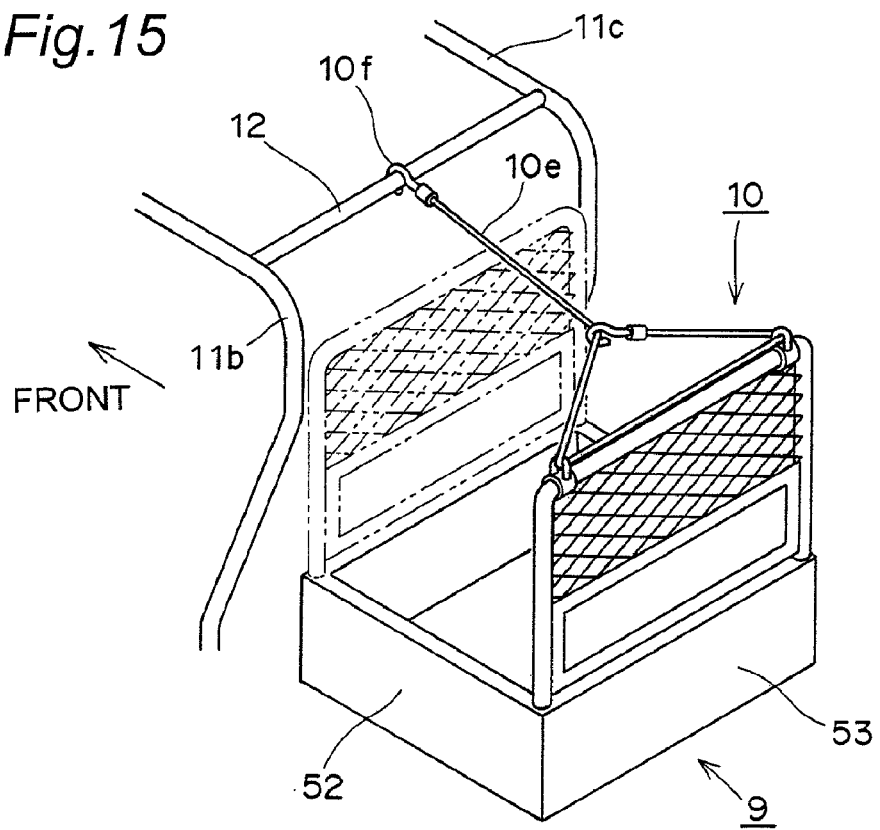
FIG. 15 is a schematic perspective view of a cargo bed 9 and a screen shield 10 according to a sixth embodiment of the present invention.
Figure 16:
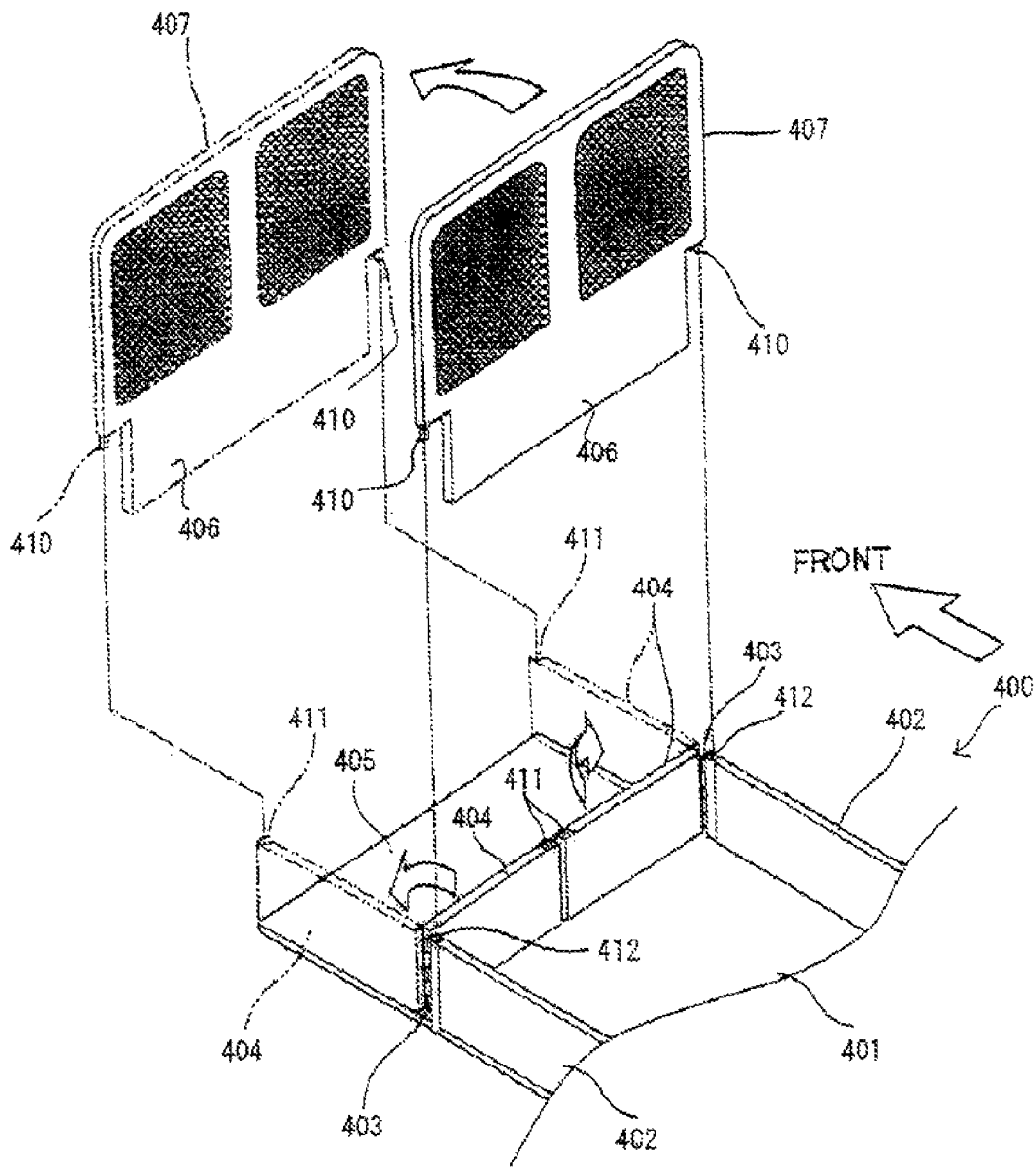
FIG. 16 is a perspective view of a cargo bed and a screen shield of the related art.

FIG. 15 is a schematic perspective view of a cargo bed 9 and a screen shield 10 showing a sixth embodiment. As shown in FIG. 15, the screen shield 10 is attachable to and detachable from the rear end of the cargo bed 9.

The lower portion of the screen shield 10 is inserted into the rear end, e.g., the rear panel 53, of the cargo bed 9. The upper portion of the screen shield 10 is fixed to the side frame members 11*c* and 11*b* or the cross frame member 12 via a wire 10*e* and a hook 10*f*. The screen shield 10 is thus attached to the rear end of the cargo bed 9.

According to the sixth embodiment, the screen shield 10 is attachable to the rear end of the cargo bed 9. The dropping of a load rearward from the cargo bed 9 can be prevented by the screen shield 10 when the pick-up style utility vehicle 1 is accelerated or goes up a slope. The load in the cargo bed 9 can be protected from an object flying from the rear.

As means locating the screen shield 10 from the front end to the rear end of the cargo bed 9, rails may be formed on the stationary side panels 52 of the cargo bed 9 and the screen shield 10 may be moved on the rails.

The present invention is not limited to the configurations of the above embodiments and includes various modification examples contemplated in the scope without departing from the contents described in the scope of the claims.

What is claimed is:

1. A pick-up style utility vehicle comprising:
   a front seat;
   a rear seat; and
   a cargo bed in this order from front;
   a cabin frame surrounding a riding space; and
   a screen shield partitioning the cargo bed and a rear riding space in front of the cargo bed; wherein:
   the cargo bed is changeable between an expanded state in which the cargo bed is expanded forward into the rear riding space and a non-expanded state not occupying the rear riding space;
   all or part of the screen shield is angle shiftable between the expanded state and the non-expanded state;
   the screen shield has a frame portion and a mesh portion; and
   the mesh portion is supported by an upper end of the frame portion and is swingable with the upper end as a swinging shaft.

2. The pick-up style utility vehicle according to claim 1, wherein the screen shield has a plurality of handle portions.

3. A pick-up style utility vehicle comprising:
   a front seat;
   a rear seat; and
   a cargo bed in this order from front;
   a cabin frame surrounding a riding space: and
   a screen shield partitioning the cargo bed and a rear riding space in front of the cargo bed; wherein:
   the cargo bed is changeable between an expanded state in which the cargo bed is expanded forward into the rear riding space and a non-expanded state not occupying the rear riding space;
   all or part of the screen shield is angle shiftable between the expanded state and the non-expanded state; and
   the screen shield is attachable to and detachable from a rear end of the cargo bed.

4. The pick-up style utility vehicle according to claim 3, wherein the screen shield has a plurality of handle portions.

* * * * *